United States Patent

[11] 3,582,775

| | | |
|---|---|---|
| [72] | Inventor | Tom N. Cornsweet<br>Berkeley, Calif. |
| [21] | Appl. No. | 793,663 |
| [22] | Filed | Jan. 24, 1969 |
| [45] | Patented | June 1, 1971 |
| [73] | Assignee | Stanford Research Institute<br>Menlo Park, Calif. |

[54] METHOD OF AND APPARATUS FOR FAST AVERAGING OF REPETITIVE SIGNALS WITH AN IMAGE STORAGE TUBE
10 Claims, 1 Drawing Fig.

[52] U.S. Cl. ............................................ 324/77,
178/7.8, 250/217
[51] Int. Cl. ............................................ G01r 23/16
[50] Field of Search ................................ 324/77 1,
88, 121; 250/217 CRT; 178/7.8; 315/8.5

[56] References Cited
UNITED STATES PATENTS

| 2,991,419 | 7/1961 | Nilsson | 324/121 |
| 3,189,889 | 6/1965 | Bridgett | 250/217X |
| 3,211,898 | 10/1965 | Fomenko | 324/77UX |

OTHER REFERENCES

Baird, I. " Pulse Frequency Measured by Photoconductor and Scopes." in Electronics. Vol. 38 No. 13. June 28, 1965. P. 77. TK] 7800. E58

*Primary Examiner*—Edward E. Kubasiewicz
*Attorney*—Urban Faubion and Lindenberg and Freilich

ABSTRACT: A method and apparatus is disclosed for averaging repetitive signals to increase the signal-to-noise ratio comprising a cathode-ray tube on which the signal is displayed as an intensity modulated horizontal line. The face of the cathode-ray tube is focused by a lens onto the photosensitive surface of an image storage tube, thereby causing the image tube to store a charge pattern that is proportional to the total amount of light that has fallen on it during a number ($n$) of horizontal sweep cycles of the cathode-ray tube. An electron beam inside the image tube scans the charge pattern every n-th cycle of the cathode-ray tube to produce a video signal that is proportional to the sum of all the signal-plus-noise events displayed on the cathode-ray tube since the last scan.

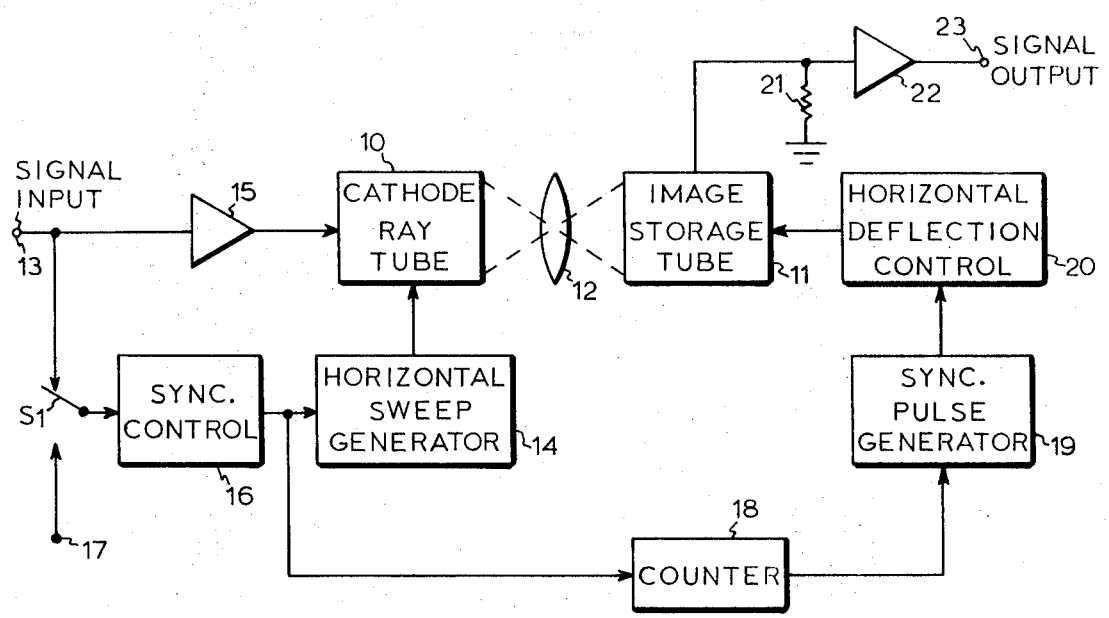

METHOD OF AND APPARATUS FOR FAST AVERAGING OF REPETITIVE SIGNALS WITH AN IMAGE STORAGE TUBE

BACKGROUND OF THE INVENTION

This invention relates to a method and apparatus for improving the signal-to-noise ratio of a repetitive signal, and more particularly for automatically summing successive repetitions of a signal and attendant noise, and producing an output signal proportional to the sum. The invention described herein was made in the performance of work under a NASA contract and is subject to the provisions of section 305 of the National Aeronautics and Space Act of 1958, Public Law 85–568 (72 Stat. 435; 42 USC 2457).

It is quite common scientific and technical work to encounter repetitive electrical signals that are accompanied by significant noise. For example, in observing biological activity, in nuclear magnetic resonance studies, in astronomical spectroscopy, and many other areas of scientific and technical endeavor, weak electrical signals are to be detected from a noisy background for examination, the cathode-ray such noise consists of electrical fluctuations not related to the signal. If a number of repetitions of the electrical event consisting of the signal and attendant noise could be averaged, the resulting signal would manifest greater signal-to-noise ratio than any one of the individual events because at each corresponding point in time during successive events, the signal is always of the same sign while the noise will sometimes be positive and sometimes negative.

SUMMARY OF THE INVENTION

According to the invention, a number of repetitions of an electrical event are effectively averaged together by displaying a succession of events (signals and attendant noise) by Z-axis (intensity) modulation of a cathode-ray tube one event at a time, with each event signal tracing substantially over the previous event signal, and imaging the face of the cathode-ray tube onto the photosensitive surface of an image storage tube to produce a stored charge pattern. After a number of events have been thus summed by cumulative storage of charge patterns, the image storage tube is scanned to read out the pattern of stored charges and thereby produce an output signal that is proportional to the sum of all the events (signals and noise) displayed on the cathode-ray tube since the last scan of the image storage tube.

The cathode-ray tube is synchronized with the signal of interest, and the image storage tube scan is synchronized with the signal of interest through a counter in order that a predetermined number of events be displayed on the cathode-ray tube for each scan of the pattern of stored charges in the image tube. The electrical event is employed to modulate the intensity of the cathode-ray tube beam while it is being deflected by a horizontal sweep control circuit. Scanning the image storage tube is then accomplished by horizontal deflection control of an electron beam.

The novel features that are considered characteristic of this invention are set forth with particularity in the appended claims. The invention will best be understood from the following description when read in connection with the accompanying drawings.

BRIEF DESCRIPTION OF THE DRAWINGS

The sole FIGURE of the drawings illustrates a block diagram of an exemplary system for carrying out the present invention.

DESCRIPTION OF THE PREFERRED EMBODIMENTS

In a preferred embodiment of the invention as shown in the sole FIGURE of the drawings, a cathode-ray tube 10 is provided with its face focused onto an image storage tube 11 by a lens system 12. The image storage tube 11 may be any one of a number of commercially available tubes in which an electron image produced by a photosensitive surface is stored as a charge pattern. The two most commonly used are the image orthicon and the vidicon. In the latter, a charge-density pattern is formed by photoconduction and stored on the surface of the photoconductive layer until scanned by an electron beam, at which time the charges of the pattern are discharged. The current which flows in discharging the pattern as the beam is deflected produces an output (video) signal. In the image orthicon, the electron image is produced by a photoemitting surface and focused on a separate storage target. The storage image is then discharged upon being scanned on its opposite side by an electron beam. However, the end result is the same as with a vidicon, namely an output signal the amplitude of which varies in accordance with the charge-density of the image being stored, and in either case the photosensitive surface of the image storage tube 11 stores at each point a charge that is proportional to the total amount of light that has fallen on it since the last time the stored image was scanned.

An input terminal 13 is adapted to be connected to a source of repetitive electrical signals that are to be examined. As noted hereinbefore, it is common for the signals of interest to be accompanied by noise. If a number of repetitions of the electrical event (signal-plus-noise) are successively displayed on the cathode-ray tube 10 before the image storage tube 11 is scanned, the stored image will be the sum of all preceding electrical events since the last time the image tube was scanned. The output signal produced upon scanning the image storage tube 11 will manifest a greater signal-to-noise ratio because at each point in the image, the signal of interest is always of the same polarity while the noise will sometimes be positive and sometimes negative. Thus, in the "averaging" process, the noise tends to cancel itself while the signal of interest tends to augment itself. This is particularly true when, as in this preferred embodiment, the beam of the cathode-ray tube sweeps only horizontally under control of a horizontal sweep generator 14 while the beam is modulated in intensity by the electrical event via an amplifier 15 connected to the appropriate element of the cathode-ray tube. The linear horizontal sweep generator 14 is synchronized with the input signal by a synchronizing control circuit 16 connected to the input terminal 13, or to another input terminal 17 by a switch $S_1$ for use when a separate synchronizing signal is available.

A counter 18 determines when a predetermined number of electrical events, or external synchronizing cycles, have been displayed by the cathode-ray tube 10 before the line on the image storage tube 11 is to be scanned. For example, the electrical event would repeat 100 times for each time the image storage tube 11 is scanned if the counter 18 is set to count 100 before initiating a scan cycle via a synchronizing pulse generator 19. At the same time, the counter resets or recycles to zero.

A horizontal deflection control circuit 20 causes a beam from an electron gun to scan the stored image along a single horizontal line. In an image orthican, the scanning beam is directed at the side of the target opposite the stored charge pattern. As the beam arrives at the target opposite an area where a charge is stored, the beam gives up as many electrons as are required to neutralize the positive charge at the point of impact. The remaining electrons of the beam leave the target and return toward dynodes near the electron gun where electron multiplication takes place. The result is an output current through a load resistor 21 which varies in amplitude in accordance with the charge density of the stored image. An amplifier 22 connected to the load resistor 21 provides voltage amplification of the output signal to provide at an output terminal 23 a video signal that may be either stored on magnetic tape for later analysis or displayed on an oscilloscope for immediate analysis.

The stored image is read out of a vidicon in the same manner as in an image orthicon. However, instead of obtaining a current from a return flow of electrons, a corresponding current is obtained as electrons of the scanning beam reach the photoconductive layer of the tube. Some of the electrons are absorbed to neutralize the stored charges of the image; the varying amounts of electrons absorbed produce the current in the load resistor 21.

It should be understood that although the image orthicon and vidicon tubes are referred to specifically, the present invention is not limited to the use of either one since all that is required is an image storage tube which will accumulate charges as the cathode-ray tube 10 repeatedly sweeps the intensity modulated beam across its face, and discharges all of the charged areas, either completely or partially, when the electron beam of the storage tube is caused to scan the stored image. There is, for example, an image tube commonly referred to as an iconoscope which functions very much like the vidicon, but is not nearly so compact because the scanning beam and optical image are both focused from the same side of the photosensitive surface, while the vidicon, as in the image orthicon, the electron beam is focused from the opposite side of the tube face. In each case, the electron beam is focused and controlled in a standard manner as an electron beam in a cathode-ray tube using a deflection coil for scanning or sweeping the face of the tube.

It should be further understood that although a Z-axis (intensity) modulation has been disclosed as a preferred embodiment of the present invention, other arrangements may occur to those skilled in the art for the operation of the cathode-ray tubes to achieve the desired "averaging" of an input signal for an improved signal-to-noise ratio in the output signal from the image storage tube.

What I claim is:

1. A method for averaging amplitudes of electrical signals representing a plurality of repetitions of an electrical event using a cathode-ray tube for signal display and an image storage tube for accumulation of charges in response to optical images, where each event signal consists of an electrical waveform of interest and attendant noise, comprising the steps of
    displaying a succession of said event signals on said cathode-ray tube, one signal at a time, on the face of said cathode-ray tube to produce an optical image,
    coupling each optical image displayed on said face of said cathode-ray tube to a photosensitive surface of said image storage tube to accumulate a stored charge pattern having an amplitude at each of successive points that is proportional to the sum of amplitudes of corresponding points of all said optical images, and
    scanning said image storage tube periodically to read out therefrom said charge pattern and thereby produce an output signal that is proportional at every instant to the sum of the amplitudes of corresponding points of said event signals displayed on said cathode-ray tube as optical images since the last scan of said image storage tube.

2. A method as defined in claim 1 including the steps of synchronizing a sweep generator of said cathode-ray tube with said event signals in order that one optical image be displayed during each sweep of said electron beam and synchronizing the scanning of said image storage tube with said event signals through a counter in order that a predetermined number of event signals be displayed as optical images on the cathode-ray tube for accumulation before each scanning operation of said image storage tube.

3. A method as defined in claim 1 including the steps of synchronizing a sweep generator of said cathode-ray tube with signals separate from said event signals, each marking the occurrence of one of said electrical events, and synchronizing the scanning of said image storage tube with said event marking signals through a counter in order that a predetermined number of event signals be displayed on the cathode-ray tube for accumulation before each scanning operation of said image storage tube.

4. A method as defined in claim 1 wherein, for the step of displaying each of said electrical event signals on said face of said cathode-ray tube, each optical image is produced by intensity modulation of a linear sweep of a single line, and wherein, for the step of reading out a stored charge pattern from said image storage tube, said image storage tube is scanned only along said stored charge pattern in a single line.

5. Apparatus for producing an output signal the waveform of which is point by point substantially an average of amplitudes of corresponding points of plurality of repetitive electrical event signals, where each event signal is an analog representation of an event and is comprised of a signal wave of interest plus noise in the form of electrical fluctuations of said wave that are not related to the signal wave of interest, said apparatus comprising:
    a cathode-ray tube having a face for displaying an image of each of said electrical event signals in sequence, a separate signal during each of a plurality of sweep cycles of said cathode-ray tube;
    means for synchronizing said seep cycles of said cathode-ray tube for display of said electrical event signals;
    an image storage tube having a scanning beam of electrons for periodically discharging a stored image to produce said output signal;
    means for optically coupling each image produced on said display face of said cathode-ray tube onto a surface of said image storage tube to produce a stored charge pattern, whereby a given point of said pattern is a charge that is proportional to the total amount of light that has fallen on said image storage tube to produce the charge of said given point since said image storage tube was last discharged by said scanning beam of electrons; and
    means for synchronizing said scanning beam to discharge said image storage tube once for every predetermined number of electrical event signals displayed on said face of said cathode-ray tube.

6. Apparatus as defined in claim 5 wherein said means for synchronizing said sweep cycles of said cathode-ray tube synchronizes said cathode-ray tube sweep cycles with said electrical event signals.

7. Apparatus as defined in claim 5 wherein said means for synchronizing said sweep cycles of said cathode-ray tube synchronizes said cathode-ray tube sweep cycles with separate signals marking the occurrence of events producing said event signals.

8. Apparatus as defined in claim 6 wherein said means for synchronizing said scanning beam of said image storage tube includes a counter at the input thereof whereby each scanning operation of said image storage tube is synchronized by said electrical event signals to be displayed on the cathode-ray tube for averaging before scanning said image storage tube.

9. Apparatus as defined in claim 7 wherein said means for synchronizing said scanning beam of said image storage tube includes a counter at the input thereof whereby each scanning operation of said image storage tube is synchronized by said event marking signals through said counter in order that a predetermined number of event signals be displayed on said cathode-ray tube for averaging before scanning said image storage tube.

10. Apparatus as defined in claim 5 wherein each of said electrical event signals is displayed on said face of said cathode-ray tube as intensity modulation of a sweep cycle consisting of a single line, and said image surface is a single line, and wherein each of said output signals is produced by said beam of electrons scanning only said imaged surface of said image storage tube.